United States Patent
Jing et al.

(10) Patent No.: US 9,660,779 B2
(45) Date of Patent: May 23, 2017

(54) METHOD, DEVICE, AND SYSTEM FOR TRANSMITTING REFERENCE SIGNAL

(71) Applicant: China Academy of Telecommunications Technology, Beijing (CN)

(72) Inventors: Meifang Jing, Beijing (CN); Xin Su, Beijing (CN); Rakesh Tamrakar, Beijing (CN); Qiubin Gao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/424,433

(22) PCT Filed: Aug. 29, 2013

(86) PCT No.: PCT/CN2013/082598
§ 371 (c)(1),
(2) Date: Feb. 26, 2015

(87) PCT Pub. No.: WO2014/032606
PCT Pub. Date: Mar. 6, 2014

(65) Prior Publication Data
US 2015/0280875 A1    Oct. 1, 2015

(30) Foreign Application Priority Data
Aug. 30, 2012    (CN) .......................... 2012 1 0316659

(51) Int. Cl.
*H04L 5/00* (2006.01)
*H04L 25/02* (2006.01)
(Continued)

(52) U.S. Cl.
CPC ......... *H04L 5/0048* (2013.01); *H04B 7/0617* (2013.01); *H04B 7/0684* (2013.01);
(Continued)

(58) Field of Classification Search
CPC ............. H04L 27/2662; H04L 27/2657; H04L 5/0048; H04L 25/0204; H04L 5/0023;
(Continued)

(56) References Cited

U.S. PATENT DOCUMENTS 5,867,478 A * 2/1999 Baum ....................... H04L 1/06
370/203
7,660,229 B2 * 2/2010 Papasakellariou ... H04B 7/0452
370/203
(Continued)

FOREIGN PATENT DOCUMENTS

| CN | 101877865 A | 11/2010 |
|---|---|---|
| CN | 102412885 A | 4/2012 |

(Continued)

OTHER PUBLICATIONS

Alcatel-Lucent Shanghai Bell et al: "Considerations on CSI feedback enhancements for high-priority antenna configurations", 3GPP Draft; R1-112420 Considerations on CSI Feedback Enhancements for High-Priority Antenna Configurations Clean, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Aug. 18, 2011.
(Continued)

*Primary Examiner* — Warner Wong
(74) *Attorney, Agent, or Firm* — Kilpatrick Townsend & Stockton LLP

(57) ABSTRACT

The present invention relates to the technical field of radio communications, and specifically relates to a method,
(Continued)

device, and system for transmitting a reference signal, for use in solving the problem in the prior art that vertical-dimension channel estimation cannot be supported and thus 3D beamforming is not supported. The method of embodiments of the present invention comprises: a network side determines a subframe (31) used for bearing the reference signal, determines a pilot frequency port (32) of the reference signal, and transmits in the determined subframe the reference signal configured in the pilot frequency port, where all of the pilot frequency ports comprise at least one row of horizontal-dimension pilot frequency ports and one column of vertical-dimension pilot frequency ports, the reference signal configured in the horizontal-dimension pilot frequency ports is a horizontal-dimension reference signal, and the reference signal configured on the vertical-dimension pilot frequency ports is a vertical-dimension reference signal (33). Because the embodiments of the present invention are capable of transmitting the vertical-dimension reference signal, implementation of channel estimation on the vertical-dimension pilot frequency ports is allowed, and implementation of a dynamic 3D beamforming technology is allowed.

11 Claims, 9 Drawing Sheets

(51) Int. Cl.
  *H04B 7/06* (2006.01)
  *H04W 16/28* (2009.01)
  *H04W 72/04* (2009.01)
(52) U.S. Cl.
  CPC .......... *H04L 5/0023* (2013.01); *H04L 5/0051* (2013.01); *H04L 25/0204* (2013.01); *H04W 16/28* (2013.01); *H04W 72/0446* (2013.01); *H04L 5/005* (2013.01)
(58) Field of Classification Search
  CPC ..... H04L 5/0051; H04L 27/2675; H04B 3/10; H04B 7/0617; H04B 7/0684; H04W 16/28; H04W 72/0446
  See application file for complete search history.

(56) References Cited

U.S. PATENT DOCUMENTS

| | | | | |
|---|---|---|---|---|
| 7,796,695 B2* | 9/2010 | Lee | ................. | H04B 7/12 375/260 |
| 7,929,416 B2* | 4/2011 | Papasakellariou | ... | H04B 7/0452 370/208 |
| 8,111,763 B2* | 2/2012 | Ma | ................. | H04B 7/0678 375/260 |
| 8,130,867 B2* | 3/2012 | Budianu | ............. | H04L 25/0202 375/260 |
| 8,363,740 B2* | 1/2013 | Stadelmeier | ......... | H04L 5/0007 375/219 |
| 8,406,118 B2* | 3/2013 | Zhu | ................. | H04B 7/04 370/208 |
| 8,432,985 B2* | 4/2013 | Budianu | ............. | H04L 25/0202 375/260 |
| 8,462,872 B2* | 6/2013 | Zhu | ................. | H04B 7/04 370/334 |
| 8,642,611 B2* | 2/2014 | Hartung | ............... | C07D 239/48 514/272 |
| 8,717,994 B2* | 5/2014 | Ko | ................. | H04B 7/0413 370/329 |
| 8,718,164 B2* | 5/2014 | Budianu | ............... | H04L 5/0048 375/259 |
| 8,724,717 B2* | 5/2014 | Lin | ................. | H04L 5/0023 375/260 |
| 8,724,718 B2* | 5/2014 | Lin | ................. | H04L 5/0023 375/260 |
| 8,811,331 B2* | 8/2014 | Koorapaty | ............ | H04L 5/0007 370/330 |
| 8,843,144 B2* | 9/2014 | Nystrom | ............... | H04L 5/0048 370/442 |
| 8,976,843 B2* | 3/2015 | Ma | ................. | H04B 7/0678 375/146 |
| 8,982,829 B2* | 3/2015 | Ko | ................. | H04B 7/0413 370/329 |
| 8,982,985 B2* | 3/2015 | Stadelmeier | .......... | H04L 5/0007 375/219 |
| 9,027,243 B2* | 5/2015 | Neumann | ............... | F03D 1/001 29/407.1 |
| 2003/0072254 A1* | 4/2003 | Ma | ............ | H04B 7/04 370/208 |
| 2006/0146948 A1* | 7/2006 | Park | ....... | H04L 5/0048 375/260 |
| 2006/0172704 A1* | 8/2006 | Nishio | ................. | H04L 5/0007 455/67.11 |
| 2006/0209670 A1* | 9/2006 | Gorokhov | ............. | H04L 5/0007 370/208 |
| 2006/0209732 A1* | 9/2006 | Gorokhov | ............. | H04B 1/715 370/310 |
| 2006/0280114 A1* | 12/2006 | Osseiran | ............. | H04L 25/0224 370/208 |
| 2007/0053282 A1* | 3/2007 | Tong | ......... | H04B 7/04 370/208 |
| 2007/0070944 A1* | 3/2007 | Rinne | .................. | H04B 7/0669 370/329 |
| 2008/0068980 A1* | 3/2008 | Lim | ....... | H04L 5/0048 370/208 |
| 2008/0075181 A1* | 3/2008 | Xia | ....... | H04L 5/0048 375/260 |
| 2008/0253469 A1* | 10/2008 | Ma | ....... | H04B 7/0678 375/260 |
| 2008/0310530 A1* | 12/2008 | Imamura | ............... | H04L 5/0044 375/260 |
| 2009/0003466 A1* | 1/2009 | Taherzadehboroujeni | | H04B 7/0669 375/260 |
| 2009/0059885 A1* | 3/2009 | Sadek | ................... | H04L 5/0007 370/343 |
| 2009/0067534 A1* | 3/2009 | Kwak | ................... | H04B 7/0413 375/267 |
| 2009/0213723 A1* | 8/2009 | Noh | ....... | H04L 1/0643 370/208 |
| 2009/0238303 A1* | 9/2009 | Mondal | ................. | H04B 7/0417 375/295 |
| 2010/0238877 A1 | 9/2010 | Nam et al. | | |
| 2011/0026482 A1* | 2/2011 | Li | .......... | H04L 5/0048 370/329 |
| 2011/0116516 A1* | 5/2011 | Hwang | ................. | H04L 5/0048 370/480 |
| 2011/0216846 A1 | 9/2011 | Lee et al. | | |
| 2013/0142156 A1* | 6/2013 | Mazzarese | ............ | H04L 5/0051 370/329 |
| 2014/0198871 A1* | 7/2014 | Ko | ....... | H04B 7/0413 375/267 |

FOREIGN PATENT DOCUMENTS

| | | |
|---|---|---|
| CN | 102938688 A | 2/2013 |
| EP | 2 866 358 A1 | 4/2015 |

OTHER PUBLICATIONS

NTT DOCOMO: "Scenarios and potential CSI feedback enhancements for DL MIMO in Rel-11", 3GPP Draft; R1-112433, 3rd Generation Partnership Project (3GPP), Mobile Competence Centre; 650, Route Des Lucioles ; F-06921 Sophia-Antipolis Cedex ; France, vol. RAN WG1, No. Athens, Greece; Aug. 16, 2011.
The Extended European Search Report issued on Aug. 14, 2015 in the KR counterpart application.

(56) References Cited

OTHER PUBLICATIONS

The Office Action issued on Jan. 23, 2015 in the TW counterpart application.
International Search Report and Written Opinion for PCT /CN2013/ 082598 (English and Chinese).

* cited by examiner

METHOD, DEVICE, AND SYSTEM FOR TRANSMITTING REFERENCE SIGNAL

The present application is a US National Stage of International Application No. PCT/CN2013/082598, filed Aug. 29, 2013, designating the United States, and claiming the benefit of Chinese Patent Application No. 201210316659.9, filed with the Chinese Patent Office on Aug. 30, 2012 and entitled "Method, device and system for transmitting reference signal", which are hereby incorporated by reference in their entireties.

FIELD

The present disclosure relates to the field of wireless communications and particularly to a method, device and system for transmitting a reference signal.

BACKGROUND

At present in the Long Term Evolution (LTE) standard of the $3^{rd}$ Generation Partnership Project (3GPP), peak data rates of a cell have been significantly improved, but rates at the edge of the cell remain far below the peak rates of the cell, and in view of this, numerous studies have been made on improving the throughput of a User Equipment (UE) at the edge of the cell and the average throughput of the cell.

In the LTE system, a relatively narrow Half Power Beam Width (HPBW) of a traditional antenna array in the vertical direction has a uniform down-inclination angle (that is, a uniform beam is provided vertically for each UE in the cell) so that it is very difficult to perform beam scheduling and interference coordination vertically between adjacent cells. The downlink angle of the antennas can be adjusted to thereby improve the performance of the system to some extent, but the downlink angle has to be adjusted very slowly as a transition to 3-dimension (3D) Beam-Forming (BM).

With 3D beam-forming, a narrow beam with a different down-inclination angle can be generated for each UE according to the location of the UE for the purpose of both horizontal and vertical beam-forming to thereby address the drawback of the traditional antennas thoroughly so as to improve the signal to noise ratio of the target UE, thus improving greatly the performance of the cellular system. At present, active antennas controllable per row and/or column have emerged in the industry; and the traditional 2D antennas are provided with only horizontal weighted ports but without vertical ports, and vertical control ports of the antennas can be added to the active antenna system to thereby accommodate a need of vertical beam-forming so as to provide a requisite hardware support for studies on 3D beam-forming.

Channel state information needs to be fed back in order to support transmission of 3D beam-forming, e.g., Channel Quality Indicator (CQI) information, Pre-coding Matrix Indicator (PMI) information and Rank Indication (RI) information, where CQI information is configured for UE scheduling, adjustment to a Modulation and Coding Scheme (MCS) and/or Multi-User Multiple Input Multiple Output (MIMO) pairing, etc., the PMI information is configured for determining beam-forming, multiple-user scheduling, MU-MIMO pairing, etc., and the RI information can be configured for determining the number of layers used for data transmission, etc.

All the channel state information needs to be calculated from channel estimation for which a corresponding Reference Signal (RS) needs to be further obtained. The reference signal, also referred to as a pilot signal, is a known signal provided by a transmitter to a receiver for channel estimation or channel probing. Reference signals for channel estimation in the existing LTE system include a Cell-specific Reference Signal (CRS) and a Channel State Information-Reference Signal (CSI-RS), where the CRS, also referred to as a downlink common reference signal or a cell common pilot, can be transmitted in each downlink sub-frame.

FIG. 1 illustrates a schematic diagram of CRS mapping in the existing conventional Circular Prefix (CP) patterns where each downlink sub-frame is configured with CRS's. R0, R1, R2 and R3 in FIG. 1 represent CRS's configured for antenna ports 0, 1, 2 and 3 respectively, where (a) illustrates a schematic diagram of a corresponding CRS configuration pattern for only one antenna port 0; (b) and (c) illustrate a schematic diagram of corresponding CRS configuration patterns for two antenna ports 0 and 1; (d), (e), (f) and (g) illustrate a schematic diagram of corresponding CRS configuration patterns for four antenna ports 0, 1, 2 and 3. For each sub-diagram in FIG. 1, the y-axis represents the frequency with each box represents a Resource Element (RE); and the x-axis represents a sub-frame including two timeslots (an odd timeslot and an even timeslot), each of which further includes seven symbols (1=0 to 6).

The CSI-RS is a reference signal defined in the LTE system release 10 (Rel-10) as a periodically configured downlink pilot, the CSI-RS is defined in the standard to be transmitted via the antenna ports 15 to 22, and numerous CSI configuration patterns are defined in the existing standard; and FIG. 2 illustrates a schematic diagram of CSI-RS mapping in the CSI configuration 0 in the existing CP patterns, where R15 to R22 in FIG. 2 represent CSI-RS's configured respectively for the ports 15 to 22. CSI-RS sub-frame configurations are as depicted in Table 1.

TABLE 1

| CSI-RS sub-frame configuration $I_{CSI-RS}$ | CSI-RS periodical $T_{CSI-RS}$ (sub-frames) | CSI-RS sub-frame compensation $\Delta_{CSI-RS}$ (sub-frames) |
| --- | --- | --- |
| 0~4 | 5 | $I_{CSI-RS}$ |
| 5~14 | 10 | $I_{CSI-RS} - 5$ |
| 15~34 | 20 | $I_{CSI-RS} - 15$ |
| 35~74 | 40 | $I_{CSI-RS} - 35$ |
| 75~154 | 80 | $I_{CSI-RS} - 75$ |

The receiver needs to perform channel estimation on a horizontal and a vertical channel based upon the transmission characteristic of 3D beam-forming to thereby calculate and feed back PMI information corresponding to the horizontal channel and the vertical channel respectively to the transmitter for further 3D beam-forming. The receiver needs to perform channel estimation with knowledge of the configuration of the reference signal, i.e., the configuration of the pilot information. However the existing configuration of the reference signal includes only the configuration of the horizontal reference signal and thus can only support estimation of the horizontal channel but can not support estimation of the vertical channel, thus failing to support 3D beam-forming.

In summary the existing configuration of the reference signal includes only the configuration of the horizontal reference signal and thus can only support estimation of the horizontal channel but can not support estimation of the vertical channel so that information about the vertical channel and a support of 3D beam-forming will be unavailable.

SUMMARY

Embodiments of the disclosure provide a method, device and system for transmitting a reference signal so as to transmit a vertical reference signal.

An embodiment of the disclosure provides a method for transmitting a reference signal, the method including:

determining, by the network side, sub-frames for carrying reference signals;

determining, by the network side, pilot ports of the reference signals; and transmitting, by the network side, the reference signals, configured on the pilot ports, in the determined sub-frames, wherein all the determined pilot ports include at least one row of horizontal pilot ports and one column of vertical pilot ports, and the reference signals configured on the horizontal pilot ports are horizontal reference signals, whereas the reference signals configured on the vertical pilot ports are vertical reference signals.

An embodiment of the disclosure provides a method for receiving a reference signal, the method including:

receiving, by a receiver, reference signals, configured on pilot ports, transmitted from the network side, wherein all the pilot ports include at least one row of horizontal pilot ports and one column of vertical pilot ports, and the reference signals configured on the horizontal pilot ports are horizontal reference signals, whereas the reference signals configured on the vertical pilot ports are vertical reference signals; and estimating, by the receiver, channel information of the horizontal pilot ports and the vertical pilot ports respectively from the horizontal reference signals and the vertical reference signals.

An embodiment of the disclosure provides a network-side device for transmitting a reference signal, the network-side device including:

a sub-frame determining module configured to determine sub-frames for carrying reference signals;

a pilot port determining module configured to determine pilot ports of the reference signals; and a transmitting module configured to transmit the reference signals, configured on the pilot ports, in the determined sub-frames, wherein all the determined pilot ports include at least one row of horizontal pilot ports and one column of vertical pilot ports, and the reference signals configured on the horizontal pilot ports are horizontal reference signals, the reference signals configured on the vertical pilot ports are vertical reference signals.

An embodiment of the disclosure provides a network-side device for receiving a reference signal, the network-side device including:

a receiving module configured to receive reference signals, configured on pilot ports, transmitted from the network side, wherein the pilot ports include at least one row of horizontal pilot ports and one column of vertical pilot ports, and the reference signals configured on the horizontal pilot ports are horizontal reference signals, whereas the reference signals configured on the vertical pilot ports are vertical reference signals; and a channel estimating module configured to estimate channel information of the horizontal pilot ports and the vertical pilot ports respectively from the horizontal reference signals and the vertical reference signals.

An embodiment of the disclosure provides a system for transmitting a reference signal, the system including:

a network-side device configured to determine sub-frames for carrying reference signals, to determine pilot ports of the reference signals and to transmit the reference signals, configured on the pilot ports, in the determined sub-frames; and a receiver configured to receive the reference signals, configured on the pilot ports, transmitted from the network side and to estimate channel information of the horizontal pilot ports and the vertical pilot ports respectively from the horizontal reference signals and the vertical reference signals, wherein all the pilot ports include at least one row of horizontal pilot ports and one column of vertical pilot ports, and the reference signals configured on the horizontal pilot ports are horizontal reference signals, whereas the reference signals configured on the vertical pilot ports are vertical reference signals.

With the embodiments of the disclosure, the vertical reference signal can be transmitted so that the receiver can estimate the channel of the vertical pilot port from the vertical reference signal to thereby perform dynamic 3D beam-forming and improve the throughput of a UE at the edge of a cell and the average throughput of the cell.

DETAILED DESCRIPTION

With the embodiments of the disclosure, a vertical reference signal can be transmitted so that a receiver can estimate a channel of a vertical pilot port from the vertical reference signal to thereby perform dynamic 3D beam-forming and improve the throughput of a UE at the edge of a cell and the average throughput of the cell.

The embodiments of the disclosure will be described below in further details with reference to the drawings.

Figure 1:
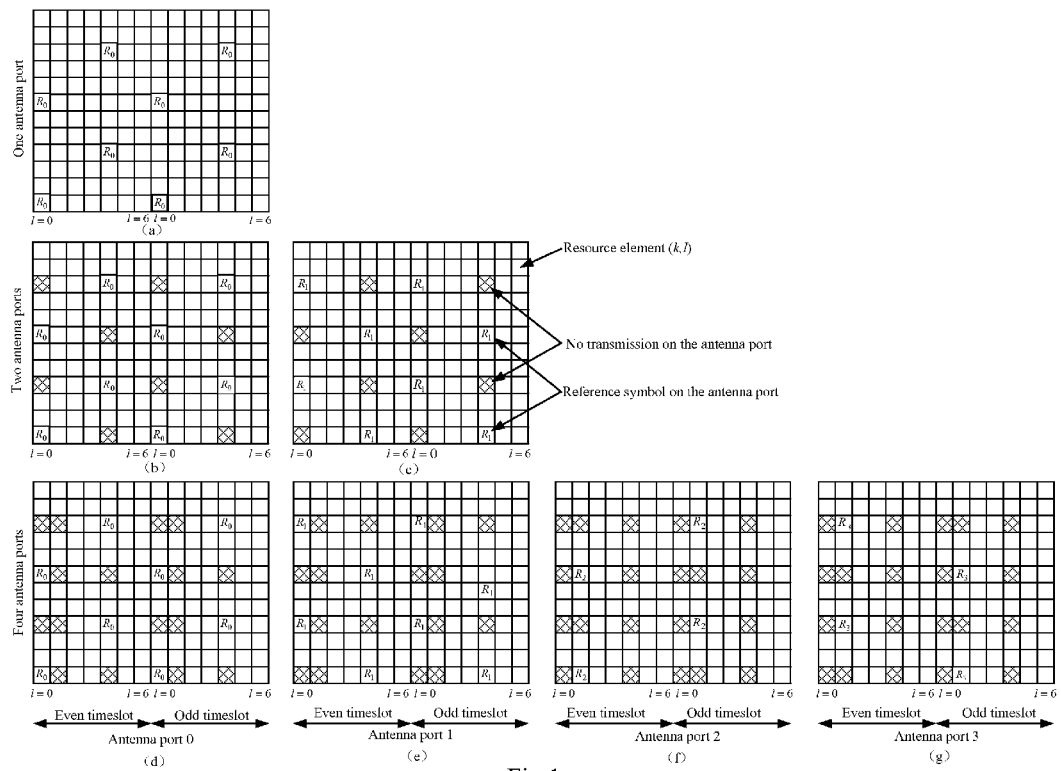
FIG. 1 illustrates a schematic diagram of CRS mapping in the CP patterns in the prior art.
Figure 2:
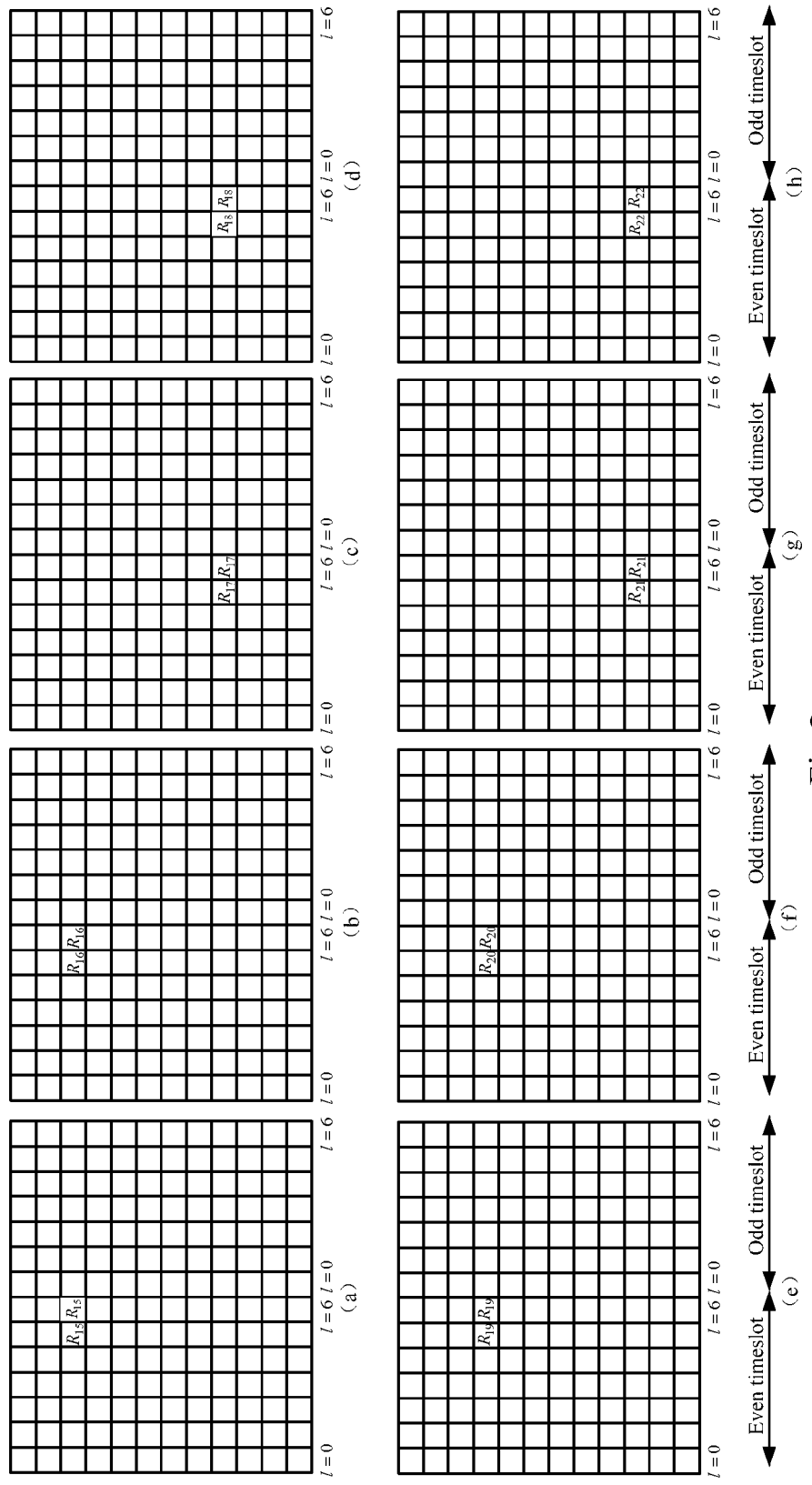
FIG. 2 illustrates a schematic diagram of CRS-RS mapping in the CP patterns in the prior art.
Figure 3:
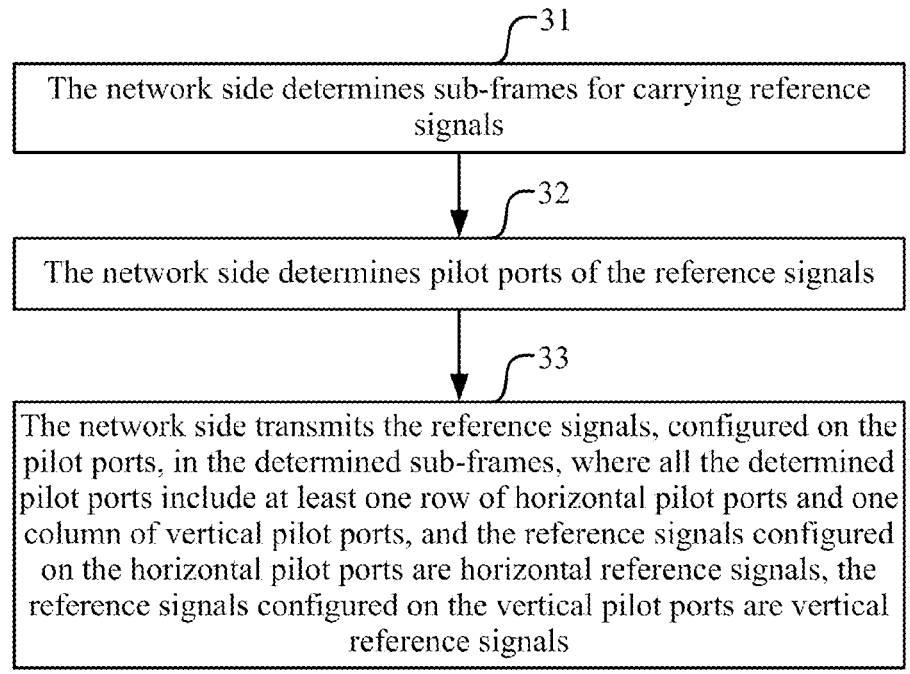
FIG. 3 illustrates a schematic flow chart of a method for transmitting a reference signal according to an embodiment of the disclosure.

As illustrated in FIG. 3, a method for transmitting a reference signal according to an embodiment of the disclosure includes the following operations:

Operation 31. The network side determines sub-frames for carrying reference signals;

Operation 32. The network side determines pilot ports of the reference signals; and Operation 33: The network side transmits the reference signals, configured on the pilot ports, in the determined sub-frames, Where all the determined pilot ports include at least one row of horizontal pilot ports and one column of vertical pilot ports, and the reference signals configured on the horizontal pilot ports are horizontal reference signals, whereas the reference signals configured on the vertical pilot ports are vertical reference signals.

It shall be noted that the pilot port mentioned in the embodiment of the disclosure refers to an antenna port for which a reference signal is configured.

Furthermore the antenna ports supported by a cell are arranged in an array, where a row in the array of antenna ports represents the horizontal direction and includes M antenna ports, whereas a column therein represents the vertical direction and includes N antenna ports, and both M and N represent positive integers no less than 1.

Preferably a set of values for M is {1, 2, 4, 8}, and a set of values for N is {1, 2, 4, 8}.

Preferably the horizontal reference signals and the vertical reference signals in the embodiment of the disclosure are Channel State Information-Reference Signals (CSI-RS's) defined in the 3GPP standard.

Figure 4A:
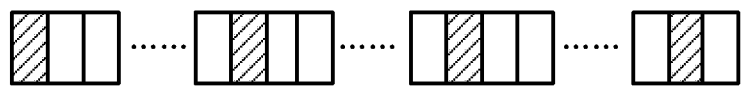
FIG. 4A illustrates a schematic diagram of a horizontal reference signal and a vertical reference signal configured in the same sub-frame according to an embodiment of the disclosure.

Furthermore the network side determines the sub-frames for carrying the reference signals in the operation 31 in the following two approaches:

In a first approach, the sub-frames for carrying the horizontal reference signals and the sub-frames for carrying the vertical reference signals are the same sub-frames as illustrated in FIG. 4A;

Preferably the horizontal reference signals and the vertical reference signals can be configured periodically or upon being triggered, where periodicities at which the horizontal reference signals and the vertical reference signals are transmitted, and the determined sub-frames for carrying the horizontal reference signals and the vertical reference signals can be prescribed between the network side and a receiver or can be notified by the network side to the receiver in higher-layer signaling or physical layer control signaling; and If the horizontal reference signals and the vertical reference signals are configured periodically, then the network side can notify the receiver of the periodicities at which and offsets of the sub-frames in which the horizontal reference signals and the vertical reference signals are transmitted before transmitting the reference signals for the first time, and If the horizontal reference signals and the vertical reference signals are configured upon being triggered, then the network side can notify the receiver of the sub-frames for carrying the horizontal reference signals and the vertical reference signals before transmitting the reference signals each time.

Figure 4B:
FIG. 4B illustrates a schematic diagram of a horizontal reference signal and a vertical reference signal configured in different sub-frames according to an embodiment of the disclosure.

In a second approach, the sub-frames for carrying the horizontal reference signals and the sub-frames for carrying the vertical reference signals are different sub-frames as illustrated in FIG. 4B; and Furthermore the horizontal reference signals and the vertical reference signals are configured respectively on the same or different frequency resources of different sub-frames.

Preferably the horizontal reference signals and/or the vertical reference signals can be configured periodically or upon being triggered; and If the horizontal reference signals and/or the vertical reference signals are configured periodically, then the periodicity at which the horizontal reference signals are transmitted and/or the periodicity at which the vertical reference signals are transmitted can be prescribed between the network side and the receiver or can be notified by the network side to the receiver in higher-layer signaling or physical layer control signaling, and If the horizontal reference signals and/or the vertical reference signals are configured upon being triggered, then the sub-frames for carrying the horizontal reference signals and the sub-frames for carrying the vertical reference signals can be prescribed between the network side and the receiver or can be notified by the network side to the receiver in higher-layer signaling or physical layer control signaling; and There are the following three scenarios for the periodicity at which the horizontal reference signals are transmitted and the periodicity at which the vertical reference signals are transmitted:

Firstly the periodicity at which the horizontal reference signals are transmitted is the same as the periodicity at which the vertical reference signals are transmitted;

Secondly the periodicity at which the vertical reference signals are transmitted is J times the periodicity at which the horizontal reference signals are transmitted, where J represents a positive integer no less than 1; and J can be a constant value or can be a value selected from a given set of values; and It shall be noted that the value of J can be prescribed between the network side and the receiver or can be notified by the network side to the receiver in higher-layer signaling or physical layer control signaling; and Thirdly the periodicity at which the horizontal reference signals are transmitted is K times the periodicity at which the vertical reference signals are transmitted, where K represents a positive integer no less than 1; and K can be a constant value or can be a value selected from a given set of values; and It shall be noted that the value of K can be prescribed between the network side and the receiver or can be notified by the network side to the receiver in higher-layer signaling or physical layer control signaling.

If the horizontal reference signals and/or the vertical reference signals are configured periodically, then the network side can notify the receiver of the periodicities at which and the offsets of the sub-frames in which the horizontal reference signals and/or the vertical reference signals are transmitted before transmitting the reference signals for the first time, and If the horizontal reference signals and/or the vertical reference signals are configured upon being triggered, then the network side can notify the receiver of the sub-frames configured for the horizontal reference signals and/or the vertical reference signals before transmitting the reference signals each time.

It shall be noted that in order to be compatible with the existing 3GPP standard, in the embodiment of the disclosure, the horizontal reference signals can be configured as CSI-RS's defined in the 3GPP 36.211 standard, and the vertical reference signals can be configured periodically or upon being triggered, and preferably the network side can configure the vertical reference signals in respective downlink sub-frames.

Particularly when the vertical reference signals are configured periodically, the sub-frames of the vertical reference signals can be configured the same as CSI-RS's defined in the 3GPP 36.211 standard to determine the periodicity at which, the offset of the sub-frames in which, and time and frequency locations at which the vertical reference signals are transmitted; and The periodicity at which and the offset of the sub-frames in which the vertical reference signals are transmitted can be configured separately from or jointly with the horizontal reference signals, for example, in order to avoid them from being configured in the same sub-frames, the offset of the sub-frames of the vertical reference signals can be set different from the offset of the sub-frames of the horizontal reference signals.

Determination of the pilot ports of the reference signals in the operation 32 will be described below in details respectively in two scenarios, where port numbers of the determined horizontal pilot ports and the CSI-RS configuration of the horizontal reference signals, and port numbers of the determined vertical pilot ports and the CSI-RS configuration of the vertical reference signals can be prescribed between the network side and the receiver or can be notified by the network side to the receiver in higher-layer signaling or physical layer control signaling.

Figure 5A:
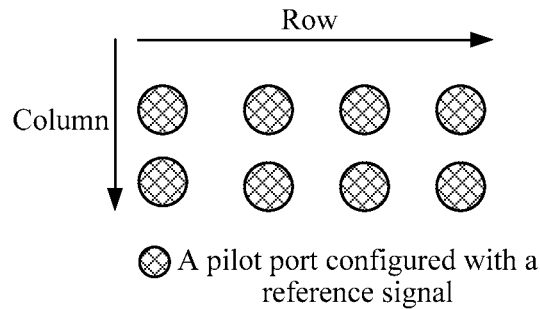
FIG. 5A illustrates a schematic diagram of first determined pilot ports according to an embodiment of the disclosure.

In a first scenario, the sub-frames carrying the horizontal reference signals and the sub-frames carrying the vertical reference signals are the same sub-frames, and the pilot ports of the reference signals are determined in the operation 32 in one of the following approaches:

In an approach A, the network side configures all the antenna ports in the array of antenna ports as pilot ports so that each row of pilot ports is a row of horizontal pilot ports and each column of pilot ports is a column of vertical pilot ports as illustrated in FIG. 5A where, for example, there are four antenna ports in each row and two antenna ports in each column in the array of antenna ports, so the number of determined pilot ports is 8; and Furthermore if M×N is less than the largest number of ports configurable for CSI-RS's defined in the 3GPP standard, then the approach A further includes the following three approaches:

In an approach A1, the network side determines the same CSI-RS configuration as configurations of the reference signal of each horizontal pilot port and the reference signal of each vertical pilot port, where the CSI-RS configuration includes a periodicity at which, an offset of a sub-frame in which, and time and frequency locations at which the CSI-RS configuration is transmitted.

Where the network side can select and allocate, to the respective pilot ports, different port numbers from port numbers configurable for CSI-RS's defined in the 3GPP standard, and antenna ports defined in the 3GPP standard for which CSI-RS's are configured include the port 15 to the port 22.

Particularly the network side can select any M*N port numbers from the port numbers 15 to 22 respectively as the port numbers of the respective pilot ports.

The CSI-RS configuration adopted in the embodiment of the disclosure is as defined in the 3GPP 36.211 protocol in which a number of CSI-RS configurations are defined but a repeated description thereof will be omitted here.

Preferably the network side allocates the port numbers 15 to (15+M*N−1) for the pilot ports.

Figure 5B:
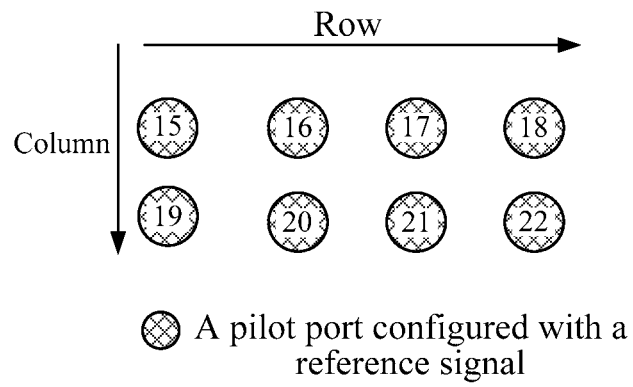
FIG. 5B illustrates a schematic diagram of a first example of port numbers allocated for the first determined pilot ports according to an embodiment of the disclosure.

Furthermore the horizontal pilot ports and the vertical pilot ports are arranged preferably in the following two patterns:

In a first arrangement pattern, the port numbers of the i-th row of horizontal pilot ports are 15+(i−1)*M to 15+i*M−1 respectively, where i represents an integer and the value of i ranges from 1 to N; and accordingly the port numbers of each column of vertical pilot ports are determined from each row of horizontal pilot ports, that is, the port numbers of the first column of vertical pilot ports are 15, (15+M), (15+2M), . . . , and (15+(N−1)*M), the port numbers of the second column of vertical pilot ports are (15+1), (15+1+M), (15+1+2M), . . . , and (15+1+(N−1)*M), and so on until all the columns of vertical pilot ports are determined;

Taking the pilot ports illustrated in FIG. 5A as an example, the network side configures the pilot ports with the port numbers as illustrated in FIG. 5B, so the network side determines the pilot port 15, the pilot port 16, the pilot port 17 and the pilot port 18 as the first row of horizontal pilot ports, and accordingly the receiver determines the reference signals of the pilot port 15, the pilot port 16, the pilot port 17 and the pilot port 18 as the first row of horizontal reference signals upon reception of the reference signal configured on each pilot port and estimates channel information of the first row of horizontal pilot ports from the first row of horizontal reference signals; and the same will apply to the other rows of horizontal pilot ports, so a repeated description thereof will be omitted here; and The network side determines the pilot port 15 and the pilot port 19 as the first column of vertical pilot ports, and accordingly the receiver determines the reference signals of the pilot port 15 and the pilot port 19 as the first column of vertical reference signals upon reception of the reference signal configured on each pilot port and estimates channel information of the first column of vertical pilot ports from the first column of vertical reference signals; and the same will apply to the other columns of vertical pilot ports, so a repeated description thereof will be omitted here.

In a second arrangement pattern, the port numbers of the j-th column of vertical pilot ports are 15+(j−1)*N to 15+j*N−1 respectively, where j represents an integer and the value of j ranges from 1 to M; and accordingly the port numbers of each row of horizontal pilot ports are determined from each column of vertical pilot ports, that is, the port numbers of the first row of horizontal pilot ports are 15, (15+N), (15+2N), . . . , and (15+(M−1)×N), the port numbers of the second row of horizontal pilot ports are (15+1), (15+1+N), (15+1+2N), . . . , and (15+1+(M−1)*N), and so on until all the rows of horizontal pilot ports are determined;

Of course, alternatively to the two preferred arrangement patterns above, the horizontal pilot ports and the vertical pilot ports can be arranged in other patterns, for example, they can be arranged randomly, where the pattern in which the horizontal pilot ports and the vertical pilot ports are arranged can be prescribed between the network side and the receiver or can be determined by the network side and notified to the receiver in higher-layer signaling or physical layer control signaling or the like.

In an approach A2, the network side determines different CSI-RS configurations respectively as configurations of the reference signals of different rows of horizontal pilot ports and the reference signals of corresponding vertical pilot ports.

Where the network side can allocate the same port number for each row of pilot ports and thus the same port number for each column of pilot ports.

Particularly the network side can select any M port numbers from the port numbers 15 to 22 respectively as the port numbers of the respective rows of pilot ports.

Figure 5C:
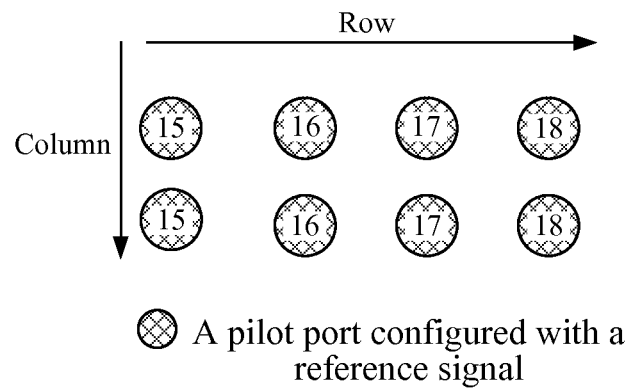
FIG. 5C illustrates a schematic diagram of a second example of port numbers allocated for the first determined pilot ports according to an embodiment of the disclosure.

Preferably the network side allocates the port numbers 15 to (15+M−1) for each row of pilot ports, where the port numbers of each row of horizontal pilot ports are 15 to (15+M−1), so all the port numbers of the j-th column of vertical pilot ports are (15+j−1), where j represents an integer and the value of j ranges from 1 to M, that is, the port 15 of the first CSI-RS configuration, the port 15 of the second CSI-RS configuration, . . . , and the port 15 of the M-th CSI-RS configuration are the first column of vertical pilot ports; the port 16 of the first CSI-RS configuration, the port 16 of the second CSI-RS configuration, . . . , and the port 16 of the M-th CSI-RS configuration are the second column of vertical pilot ports, and so on until all the columns of vertical pilot ports are determined;

Taking the pilot ports illustrated in FIG. 5A again as an example, the network side configures the pilot ports with the port numbers as illustrated in FIG. 5C, so the network side determines the pilot port 15, the pilot port 16, the pilot port 17 and the pilot port 18 of the first CSI-RS configuration as the first row of horizontal pilot ports, and accordingly the receiver determines the reference signals of the pilot port 15, the pilot port 16, the pilot port 17 and the pilot port 18 of the first CSI-RS configuration as the first row of horizontal reference signals upon reception of the reference signal configured on each pilot port and estimates channel information of the first row of horizontal pilot ports from the first row of horizontal reference signals; and the same will apply to the other rows of horizontal pilot ports, so a repeated description thereof will be omitted here; and The network side determines the pilot port 15 of the first CSI-RS configuration and the pilot port 15 of the second CSI-RS configuration as the first column of vertical pilot ports, and accordingly the receiver determines the reference signals of the pilot port 15 of the first CSI-RS configuration and the pilot port 15 of the second CSI-RS configuration as the first column of vertical reference signals upon reception of the reference signal configured on each pilot port and estimates channel information of the first column of vertical pilot ports from the first column of vertical reference signals; and the same will apply to the other columns of vertical pilot ports, so a repeated description thereof will be omitted here.

Of course, the port numbers configured for the pilot ports can alternatively be allocated in other patterns, for example, they can be allocated randomly, where the pattern in which the horizontal pilot ports and the vertical pilot ports are arranged can be prescribed between the network side and the receiver or can be determined by the network side and notified to the receiver in higher-layer signaling or physical layer control signaling or the like.

In an approach A3, the network side determines different CSI-RS configurations as the configurations of the reference signals of the different columns of vertical pilot ports and the reference signals of the corresponding horizontal pilot ports.

Where the network side can allocate the same port number for each column of pilot ports and thus the same port number for each row of pilot ports.

Particularly the network side can select any N port numbers from the port numbers 15 to 22 respectively as the port numbers of the respective columns of pilot ports.

Figure 5D:
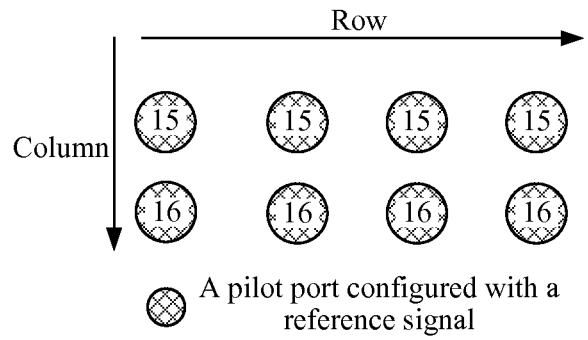
FIG. 5D illustrates a schematic diagram of a third example of port numbers allocated for the first determined pilot ports according to an embodiment of the disclosure.

Preferably the network side allocates the port numbers 15 to (15+N−1) for each column of pilot ports, where the port numbers of each column of vertical pilot ports are 15 to (15+N−1), so all the port numbers of the i-th row of horizontal pilot ports are (15+i−1), where i represents an integer and the value of i ranges from 1 to N, that is, the port 15 of the first CSI-RS configuration, the port 15 of the second CSI-RS configuration, . . . , and the port 15 of the N-th CSI-RS configuration are the first row of horizontal pilot ports; the port 16 of the first CSI-RS configuration, the port 16 of the second CSI-RS configuration, . . . , and the port 16 of the N-th CSI-RS configuration are the second row of horizontal pilot ports, and so on until all the rows of horizontal pilot ports are determined;

Taking the pilot ports illustrated in FIG. 5A again as an example, the network side configures the pilot ports with the port numbers as illustrated in FIG. 5D, so the network side determines the pilot port 15 and the pilot port 16 of the first CSI-RS configuration as the first column of vertical pilot ports, and accordingly the receiver determines the reference signals of the pilot port 15 and the pilot port 16 of the first CSI-RS configuration as the first column of vertical reference signals upon reception of the reference signal configured on each pilot port and estimates channel information of the first column of vertical pilot ports from the first column of vertical reference signals; and the same will apply to the other columns of vertical pilot ports, so a repeated description thereof will be omitted here; and The network side determines the pilot port 15 of the first CSI-RS configuration, the pilot port 15 of the second CSI-RS configuration, the pilot port 15 of the third CSI-RS configuration, and the pilot port 15 of the fourth CSI-RS configuration as the first row of horizontal pilot ports, and accordingly the receiver determines the reference signals of the pilot port 15 of the first CSI-RS configuration, the pilot port 15 of the second CSI-RS configuration, the pilot port 15 of the third CSI-RS configuration, and the pilot port 15 of the fourth CSI-RS configuration as the first row of horizontal reference signals upon reception of the reference signal configured on each pilot port and estimates channel information of the first row of horizontal pilot ports from the first row of horizontal reference signals; and the same will apply to the other rows of horizontal pilot ports, so a repeated description thereof will be omitted here.

Of course, the port numbers configured for the pilot ports can alternatively be allocated in other patterns, for example, they can be allocated randomly, where the pattern in which the horizontal pilot ports and the vertical pilot ports are arranged can be prescribed between the network side and the receiver or can be determined by the network side and notified to the receiver in higher-layer signaling or physical layer control signaling or the like.

Furthermore if M*N is larger than the largest number of ports configurable for CSI-RS's, then the network side can determine the horizontal pilot ports and the vertical pilot ports in the approach A2 and the approach A3.

Figure 6A:
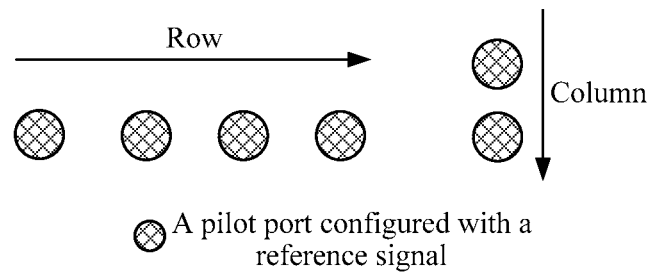
FIG. 6A illustrates a schematic diagram of second determined pilot ports according to an embodiment of the disclosure.

In an approach B, the network side virtualizes the antennas from the array of antenna ports into a row of pilot ports and a column of pilot ports for which reference signals need to be configured and determines the row of pilot ports as horizontal pilot ports and the column of pilot ports as vertical pilot ports, where the number of a row of pilot ports is M, and the number of a column of pilot ports is N, totaling to (M+N) pilot ports as illustrated in FIG. 6A where the number of a row of pilot ports is 4 and the number of a column of pilot ports is 2 as a result of virtualization, so the number of determined pilot ports is 6.

Furthermore the network side virtualizes the antennas in the following two approaches:

In a first approach, the network side selects and configures some row and some column from the array of antenna ports as pilot ports; or In a second approach, the network side virtualizes the antennas by constant antenna virtualization weights into a row of pilot ports and a column of pilot ports for which reference signals need to be configured.

Furthermore if M+N is no larger than the largest number of ports configurable for CSI-RS's defined in the 3GPP standard, then the approach B further includes the following two approaches:

In an approach B1, the network side determines the same CSI-RS configuration as configurations of the reference signal of each horizontal pilot port and the reference signal of each vertical pilot port.

Where the network side can allocate different port numbers for the respective pilot ports.

Particularly the network side can select any M+N port numbers from the port numbers 15 to 22 respectively as the port numbers of the respective pilot ports.

Preferably the network side allocates the port numbers 15 to (15+M*N−1) for the pilot ports.

Figure 6B:
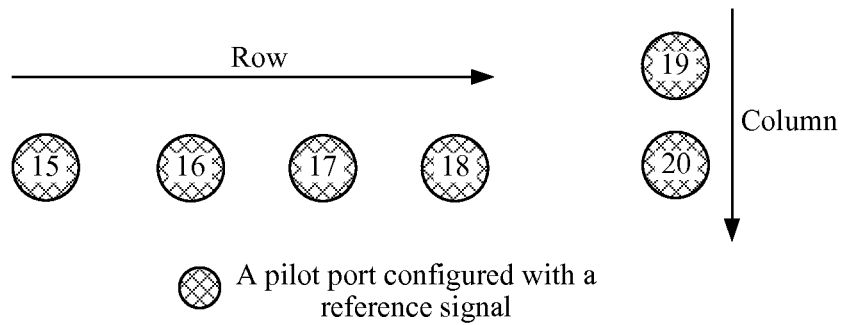
FIG. 6B illustrates a schematic diagram of a first example of port numbers allocated for the second determined pilot ports according to an embodiment of the disclosure.

Taking the pilot ports illustrated in FIG. 6A as an example, the network side configures the pilot ports with the port numbers as illustrated in FIG. 6B, so the network side determines the pilot port 15, the pilot port 16, the pilot port 17 and the pilot port 18 as the horizontal pilot ports, and accordingly the receiver determines the CSI-RS's of the pilot port 15, the pilot port 16, the pilot port 17 and the pilot port 18 as a row of horizontal reference signals upon reception of the reference signal configured on each pilot port and estimates channel information of the row of horizontal pilot ports from the row of horizontal reference signals; and The network side determines the pilot port 19 and the pilot port 20 as a column of vertical pilot ports, and accordingly the receiver determines the reference signals of the pilot port 19 and the pilot port 20 as a column of vertical reference signals upon reception of the reference signal configured on each pilot port and estimates channel information of the column of vertical pilot ports from the column of vertical reference signals.

Of course, the port numbers configured for the pilot ports can alternatively be allocated in other patterns, for example, they can be allocated randomly, where the pattern in which the horizontal pilot ports and the vertical pilot ports are arranged can be prescribed between the network side and the receiver or can be determined by the network side and notified to the receiver in higher-layer signaling or physical layer control signaling or the like.

In an approach B2, the network side determines different CSI-RS configurations respectively as configurations of the reference signals of the horizontal pilot ports and the reference signals of the vertical pilot ports.

Where the network side can select any M port numbers from the port numbers 15 to 22 respectively as the port numbers of the horizontal pilot ports and any N port numbers from the port numbers 15 to 22 respectively as the port numbers of the respective vertical pilot ports.

Figure 6C:
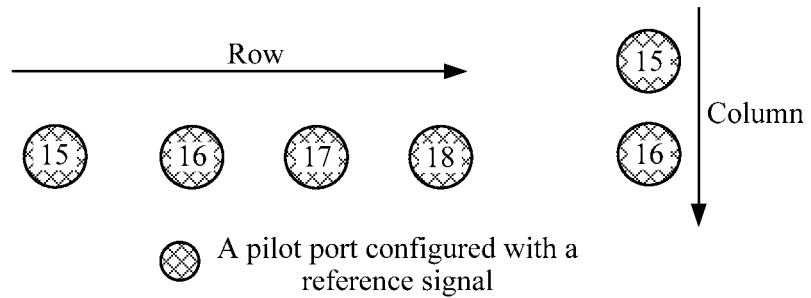
FIG. 6C illustrates a schematic diagram of a second example of port numbers allocated for the second determined pilot ports according to an embodiment of the disclosure.

Preferably the network side allocates the port numbers 15 to (15+M−1) for the horizontal pilot ports and the port numbers 15 to (15+N−1) for the vertical pilot ports;

Taking the pilot ports illustrated in FIG. 6A again as an example, the network side configures the pilot ports with the port numbers as illustrated in FIG. 6C, and if the network side configures the horizontal reference signals with a CSI-RS configuration which is the first CSI-RS configuration, and the vertical reference signals with a CSI-RS configuration which is the second CSI-RS configuration, then the network side determines the pilot port 15, the pilot port 16, the pilot port 17 and the pilot port 18 of the first CSI-RS configuration as the horizontal pilot ports and determines channel information of the row of horizontal pilot ports from the row of horizontal reference signals; and The network side determines the pilot port 15 and the pilot port 16 of the second CSI-RS configuration as the vertical pilot ports, and accordingly the receiver determines the reference signals of the pilot port 15 and the pilot port 16 as the vertical reference signals upon reception of the reference signal configured on each pilot port and estimates channel information of the column of vertical pilot ports from the column of vertical reference signals.

Of course, the port numbers configured for the pilot ports can alternatively be allocated in other patterns which will not be enumerated here, where the pattern in which the horizontal pilot ports and the vertical pilot ports are arranged can be prescribed between the network side and the receiver or can be determined by the network side and notified to the receiver in higher-layer signaling or physical layer control signaling or the like.

In a second scenario, the sub-frames carrying the horizontal reference signals and the sub-frames carrying the vertical reference signals are different sub-frames, and the operation 32 is performed particularly as follows:

The network side virtualizes the antennas from the array of antenna ports into a row of pilot ports and a column of pilot ports for which reference signals need to be configured and determines the row of pilot ports as horizontal pilot ports and the column of pilot ports as vertical pilot ports, where the number of a row of pilot ports is M, and the number of a column of pilot ports is N.

Particularly the network side can select any M port numbers from the port numbers 15 to 22 respectively as the port numbers of the respective horizontal pilot ports; and The network side can select any N port numbers from the port numbers 15 to 22 respectively as the port numbers of the respective vertical pilot ports.

Preferably the network side allocates the port numbers 15 to (15+M−1) for the horizontal pilot ports; and the network side allocates the port numbers 15 to (15+N−1) for the vertical pilot ports.

It shall be noted that the port numbers of the horizontal pilot ports and the vertical pilot ports can be prescribed between the network side and the receiver or can be determined by the network side and notified to the receiver in higher-layer signaling or physical layer control signaling or the like.

Preferably the network side transmits the reference signals, configured on the pilot ports, in the determined sub-frames in the operation 33 as follows:

The network side transmits the reference signals, configured on the horizontal pilot ports, in the sub-frames carrying the horizontal reference signals, in each preset periodicity at which the horizontal reference signals are transmitted; and/or The network side transmits the reference signals, configured on the vertical pilot ports, in the sub-frames carrying the vertical reference signals, in each preset periodicity at which the vertical reference signals are transmitted.

Furthermore the periodicity at which the vertical reference signals are transmitted is the same as the periodicity at which the horizontal reference signals are transmitted; or The periodicity at which the vertical reference signals are transmitted is J times the periodicity at which the horizontal reference signals are transmitted, where J represents an integer no less than 1; or The periodicity at which the horizontal reference signals are transmitted is K times the periodicity at which the vertical reference signals are transmitted, where K represents an integer no less than 1.

Figure 7A:
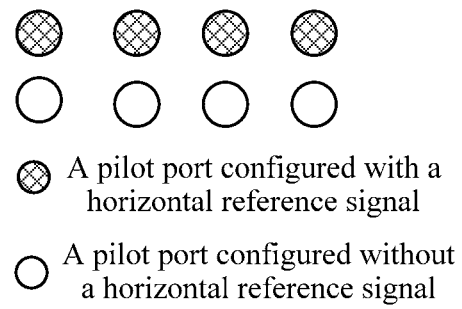
FIG. 7A to FIG. 7B illustrate schematic diagrams of examples of periodically configured horizontal reference signals according to an embodiment of the disclosure.
Figure 7B:
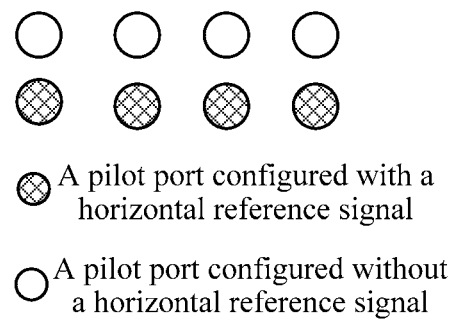

Furthermore the network side further determines the horizontal pilot ports and the vertical pilot ports in the operation 32 in one or a combination of the following approaches:

In a first approach, different rows are selected from the respective rows in the array of antenna ports and configured as the pilot ports in each periodicity at which the horizontal reference signals are transmitted;

For example, the first row in the array of antenna ports is selected and configured as the horizontal pilot ports in the first periodicity at which the horizontal reference signals are transmitted as illustrated in FIG. 7A, and accordingly the receiver performs channel estimation of the horizontal pilot ports from the reference signals, configured on the horizontal pilot ports, received in the first periodicity at which the horizontal reference signals are transmitted; and the second row in the array of antenna ports is selected and configured as the horizontal pilot ports in the second periodicity at which the horizontal reference signals are transmitted as illustrated in FIG. 7B, and accordingly the receiver performs channel estimation of the horizontal pilot ports from the reference signals, configured on the horizontal pilot ports, received in the second periodicity at which the horizontal reference signals are transmitted, thus traversing all the horizontal channels, where the horizontal reference signals corresponding to the first row and the second row in the array of antennas can be configured over the same resource or can be configured over different resources.

Figure 8A:
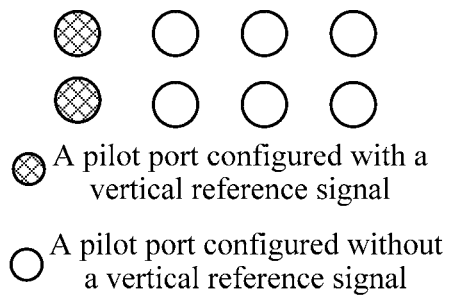
FIG. 8A to FIG. 8D illustrate schematic diagrams of examples of periodically configured vertical reference signals according to an embodiment of the disclosure.
Figure 8B:
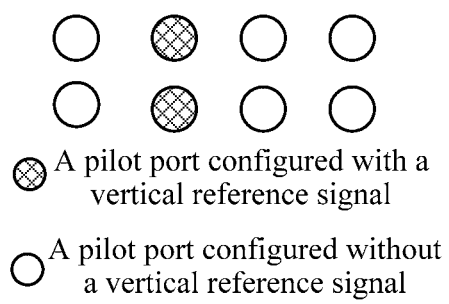
Figure 8C:
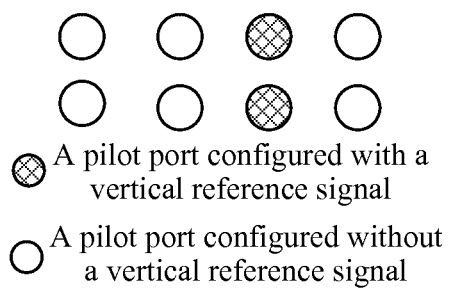
Figure 8D:
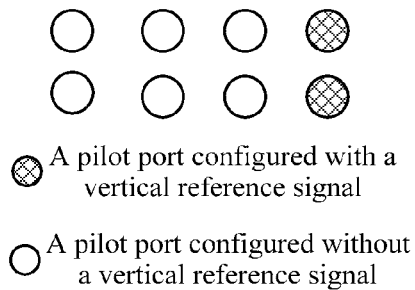

In a second approach, different columns are selected from the respective columns in the array of antenna ports and configured as the pilot ports in each periodicity at which the vertical reference signals are transmitted;

For example, the first column in the array of antenna ports is selected and configured as the vertical pilot ports in the first periodicity at which the vertical reference signals are transmitted as illustrated in FIG. 8A, and accordingly the receiver performs channel estimation of the vertical pilot ports from the reference signals, configured on the vertical pilot ports, received in the first periodicity at which the vertical reference signals are transmitted; the second column in the array of antenna ports is selected and configured as the vertical pilot ports in the second periodicity at which the vertical reference signals are transmitted as illustrated in FIG. 8B, and accordingly the receiver performs channel estimation of the vertical pilot ports from the reference signals, configured on the vertical pilot ports, received in the second periodicity at which the vertical reference signals are transmitted; the third column in the array of antenna ports is selected and configured as the vertical pilot ports in the third periodicity at which the vertical reference signals are transmitted as illustrated in FIG. 8C, and accordingly the receiver performs channel estimation of the vertical pilot ports from the reference signals, configured on the vertical pilot ports, received in the third periodicity at which the vertical reference signals are transmitted; and the fourth column in the array of antenna ports is selected and configured as the vertical pilot ports in the fourth periodicity at which the vertical reference signals are transmitted as illustrated in FIG. 8D, and accordingly the receiver performs channel estimation of the vertical pilot ports from the reference signals, configured on the vertical pilot ports, received in the fourth periodicity at which the vertical reference signals are transmitted, thus traversing all the vertical channels, where the vertical reference signals corresponding to the respective columns in the array of antennas can be configured over the same resource or can be configured over different resources.

Of course, the network side can alternatively configure the pilot ports upon being triggered so that the same row or different rows is or are selected from the respective rows in the array of antenna ports and configured as the pilot ports in each periodicity at which the horizontal reference signals are transmitted; and the same column or different columns is or are selected from the respective columns in the array of antenna ports and configured as the pilot ports in each periodicity at which the vertical reference signals are transmitted.

Preferably before the operation 32 and after the operation 33, the embodiment of the disclosure further includes:

The network side transmits configuration information of the horizontal reference signals and the vertical reference signals to the receiver to instruct the receiver to determine the corresponding horizontal reference signals and vertical reference signals from the configuration information of the horizontal reference signals and the vertical reference signals, where the configuration information includes sub-frame configurations of the horizontal reference signals and the vertical reference signals, and configurations of the horizontal pilot ports and the vertical pilot ports.

Particularly the configuration information includes but will not be limited to one or a combination of the following information in the case of being configured periodically:

The pilot port settings, the pilot patterns, the transmission periodicities, the sub-frame offsets, etc., of the horizontal reference signals and the vertical reference signals; and The configuration information includes but will not be limited to one or a combination of the following information in the case of being configured upon being triggered:

The pilot port settings, the pilot patterns, the transmission periodicities, and the numbers of the sub-frames in which or trigger conditions under which the horizontal reference signals and the vertical reference signals are transmitted.

Preferably the network side transmits the configuration information of the horizontal reference signals and the vertical reference signals in higher-layer signaling or physical layer control signaling.

Preferably the configuration information further includes indication information to indicate configuration information for the horizontal reference signals and configuration information for the vertical reference signals among the configuration information.

Of course, the configuration information may not include the indication information as long as the receiver receives the configuration information of the reference signals in the two dimensions.

Figure 9:
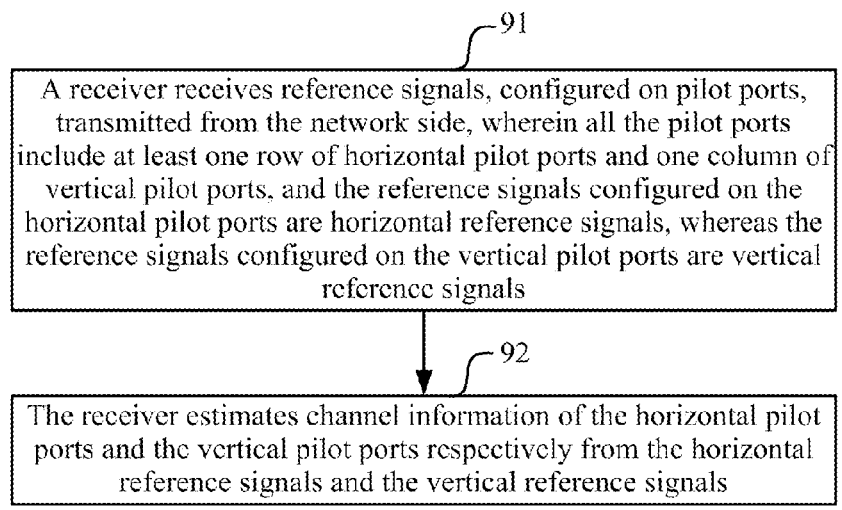
FIG. 9 illustrates a schematic flow chart of a method for receiving a reference signal according to an embodiment of the disclosure.

Referring to FIG. 9, an embodiment of the disclosure provides a method for receiving a reference signal, the method including:

Operation 91. A receiver receives reference signals, configured on pilot ports, transmitted from the network side, where all the pilot ports include at least one row of horizontal pilot ports and one column of vertical pilot ports, and the reference signals configured on the horizontal pilot ports are horizontal reference signals, whereas the reference signals configured on the vertical pilot ports are vertical reference signals; and Operation 92. The receiver estimates channel information of the horizontal pilot ports and the vertical pilot ports respectively from the horizontal reference signals and the vertical reference signals.

Since the horizontal reference signals and the vertical reference signals are configured the same as they are configured at the network side, a repeated description thereof will be omitted here.

Furthermore, before the operation 91, the method further includes:

The receiver receives configuration information of the horizontal reference signals and the vertical reference signals transmitted from the network side, where the configuration information includes sub-frame configurations of the horizontal reference signals and the vertical reference signals, and configurations of the horizontal pilot ports and the vertical pilot ports.

Based upon the same inventive idea, an embodiment of the disclosure further provides a network-side device for transmitting a reference signal, and since the network-side device addresses the problem under a similar principle to the method for transmitting a reference signal, reference can be made to the implementation of the method for an implementation of the network-side device, and a repeated description thereof will be omitted here.

Figure 10A:
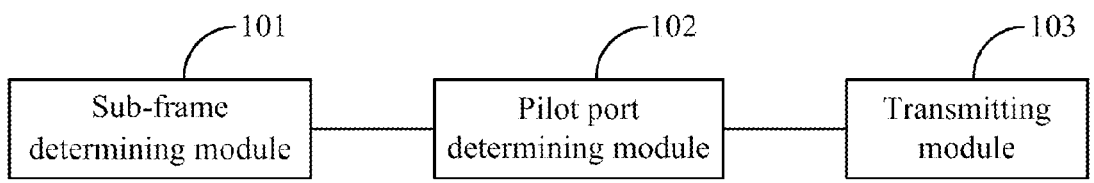
FIG. 10A illustrates a schematic functionally structural diagram of a network-side device for transmitting a reference signal according to an embodiment of the disclosure.

Referring to FIG. 10A, a network-side device for transmitting a reference signal according to an embodiment of the disclosure includes:

A sub-frame determining module 101 is configured to determine sub-frames for carrying reference signals;

A pilot port determining module 102 is configured to determine pilot ports of the reference signals; and A transmitting module 103 is configured to transmit the reference signals, configured on the pilot ports, in the determined sub-frames, Where all the determined pilot ports include at least one row of horizontal pilot ports and one column of vertical pilot ports, and the reference signals configured on the horizontal pilot ports are horizontal reference signals, whereas the reference signals configured on the vertical pilot ports are vertical reference signals.

Preferably the pilot port determining module 102 is configured:

When the sub-frames carrying the horizontal reference signals and the sub-frames carrying the vertical reference signals are the same sub-frames, to configure all of antenna ports in an array of antenna ports as pilot ports and to determine each row of pilot ports as a row of horizontal pilot ports and each column of pilot ports as a row of vertical pilot ports; or To virtualize antennas from the array of antenna ports into a row of pilot ports and a column of pilot ports for which reference signals need to be configured and to determine the row of pilot ports as horizontal pilot ports and the column of pilot ports as vertical pilot ports, where the number of a row of pilot ports is M, and the number of a column of pilot ports is N.

Preferably the pilot port determining module 102 is further configured:

If M*N is no larger than the largest number of ports configurable for CSI-RS's defined in the 3GPP standard, to determine the same CSI-RS configuration as configurations of the reference signal of each horizontal pilot port and the reference signal of each vertical pilot port, Where the CSI-RS configuration includes a periodicity at which, an offset of a sub-frame in which, and time and frequency locations at which a CSI-RS is transmitted.

Preferably the pilot port determining module 102 is further configured:

To determine different CSI-RS configurations respectively as configurations of the reference signals of different rows of horizontal pilot ports and the reference signals of corresponding vertical pilot ports; or To determine different CSI-RS configurations respectively as configurations of the reference signals of different columns of vertical pilot ports and the reference signals of corresponding horizontal pilot ports.

Preferably the pilot port determining module 102 is further configured:

To select and configure some row and some column from the array of antenna ports as pilot ports; or To virtualize the antennas by constant antenna virtualization weights into a row of pilot ports and a column of pilot ports for which reference signals need to be configured.

Preferably the pilot port determining module 102 is configured:

If M+N is no larger than the largest number of ports configurable for CSI-RS's defined in the 3GPP standard, and different port numbers are allocated for the respective pilot ports, to determine the same CSI-RS configuration as configurations of the reference signal of each horizontal pilot port and the reference signal of each vertical pilot port.

Preferably the pilot port determining module 102 is further configured:

To determine different CSI-RS configurations respectively as configurations of the reference signals of the horizontal pilot ports and the reference signals of the vertical pilot ports.

Preferably the pilot port determining module 102 is further configured:

When the sub-frames carrying the horizontal reference signals and the sub-frames carrying the vertical reference signals are different sub-frames, to virtualize antennas from an array of antenna ports into a row of pilot ports and a column of pilot ports for which reference signals need to be configured and to determine the row of pilot ports as horizontal pilot ports and the column of pilot ports as vertical pilot ports, where the number of a row of pilot ports is M, and the number of a column of pilot ports is N.

Preferably the transmitting module 103 is further configured:

To transmit the reference signals, configured on the horizontal pilot ports, in the sub-frames carrying the horizontal reference signals in each preset periodicity at which the horizontal reference signals are transmitted; and/or To transmit the reference signals, configured on the vertical pilot ports, in the sub-frames carrying the vertical reference signals in each preset periodicity at which the vertical reference signals are transmitted.

Preferably the pilot port determining module 102 is further configured:

To select and configure different rows from the respective rows in the array of antenna ports as pilot ports in each periodicity at which the horizontal reference signals are transmitted; and To select and configure different columns from the respective columns in the array of antenna ports as pilot ports in each periodicity at which the vertical reference signals are transmitted.

Preferably the transmitting module 103 is further configured:

To transmit configuration information of the horizontal reference signals and the vertical reference signals to a receiver, where the configuration information includes sub-frame configurations of the horizontal reference signals and the vertical reference signals, and configurations of the horizontal pilot ports and the vertical pilot ports.

Figure 10B:
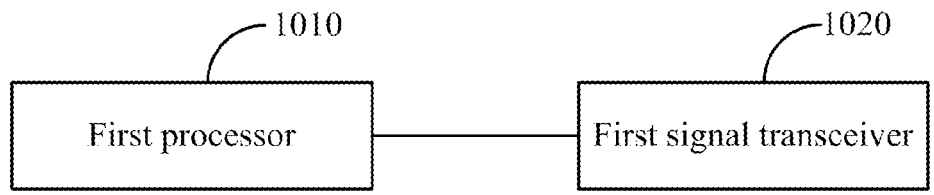
FIG. 10B illustrates a schematic physically structural diagram of a network-side device for transmitting a reference signal according to an embodiment of the disclosure.

Particularly in hardware, the sub-frame determining module 101 and the pilot port determining module 102 can be processors, and the transmitting module 103 can be a signal transceiver including transmit and receive antennas, etc., and at this time, as illustrated in FIG. 10B, a network-side device for transmitting a reference signal according to an embodiment of the disclosure includes:

A first processor 1010 is configured to determine sub-frames for carrying reference signals and to determine pilot ports of the reference signals; and A first signal transceiver 1020 is configured to transmit the reference signals, configured on the pilot ports, in the determined sub-frames, Where all the determined pilot ports include at least one row of horizontal pilot ports and one column of vertical pilot ports, and the reference signals configured on the horizontal pilot ports are horizontal reference signals, whereas the reference signals configured on the vertical pilot ports are vertical reference signals.

Preferably the first processor 1010 is configured:

When the sub-frames carrying the horizontal reference signals and the sub-frames carrying the vertical reference signals are the same sub-frames, to configure all of antenna ports in an array of antenna ports as pilot ports and to determine each row of pilot ports as a row of horizontal pilot ports and each column of pilot ports as a row of vertical pilot ports; or To virtualize antennas from the array of antenna ports into a row of pilot ports and a column of pilot ports for which reference signals need to be configured and to determine the row of pilot ports as horizontal pilot ports and the column of pilot ports as vertical pilot ports, where the number of a row of pilot ports is M, and the number of a column of pilot ports is N.

Preferably the first processor 1010 is further configured:

If M*N is no larger than the largest number of ports configurable for CSI-RS's defined in the 3GPP standard, to determine the same CSI-RS configuration as configurations of the reference signal of each horizontal pilot port and the reference signal of each vertical pilot port, Where the CSI-RS configuration includes a periodicity at which, an offset of a sub-frame in which, and time and frequency locations at which a CSI-RS is transmitted.

Preferably the first processor 1010 is further configured:

To determine different CSI-RS configurations respectively as configurations of the reference signals of different rows of horizontal pilot ports and the reference signals of corresponding vertical pilot ports; or To determine different CSI-RS configurations respectively as configurations of the reference signals of different columns of vertical pilot ports and the reference signals of corresponding horizontal pilot ports.

Preferably the first processor 1010 is further configured:

To select and configure some row and some column from the array of antenna ports as pilot ports; or To virtualize the antennas by constant antenna virtualization weights into a row of pilot ports and a column of pilot ports for which reference signals need to be configured.

Preferably the first processor 1010 is configured:

If M+N is no larger than the largest number of ports configurable for CSI-RS's defined in the 3GPP standard, and different port numbers are allocated for the respective pilot ports, to determine the same CSI-RS configuration as configurations of the reference signal of each horizontal pilot port and the reference signal of each vertical pilot port.

Preferably the first processor 1010 is further configured:

To determine different CSI-RS configurations respectively as configurations of the reference signals of the horizontal pilot ports and the reference signals of the vertical pilot ports.

Preferably the first processor 1010 is further configured:

When the sub-frames carrying the horizontal reference signals and the sub-frames carrying the vertical reference signals are different sub-frames, to virtualize antennas from an array of antenna ports into a row of pilot ports and a column of pilot ports for which reference signals need to be configured and to determine the row of pilot ports as horizontal pilot ports and the column of pilot ports as vertical pilot ports, where the number of a row of pilot ports is M, and the number of a column of pilot ports is N.

Preferably the first signal transceiver 1020 is further configured:

To transmit the reference signals, configured on the horizontal pilot ports, in the sub-frames carrying the horizontal reference signals in each preset periodicity at which the horizontal reference signals are transmitted; and/or To transmit the reference signals, configured on the vertical pilot ports, in the sub-frames carrying the vertical reference signals in each preset periodicity at which the vertical reference signals are transmitted.

Preferably the first processor 1010 is further configured:

To select and configure different rows from the respective rows in the array of antenna ports as pilot ports in each periodicity at which the horizontal reference signals are transmitted; and To select and configure different columns from the respective columns in the array of antenna ports as pilot ports in each periodicity at which the vertical reference signals are transmitted.

Preferably the first signal transceiver 1020 is further configured:

To transmit configuration information of the horizontal reference signals and the vertical reference signals to a receiver, where the configuration information includes sub-frame configurations of the horizontal reference signals and the vertical reference signals, and configurations of the horizontal pilot ports and the vertical pilot ports.

Based upon the same inventive idea, an embodiment of the disclosure further provides a network-side device for receiving a reference signal, and since the network-side device addresses the problem under a similar principle to the method for receiving a reference signal, reference can be made to the implementation of the method for an implementation of the network-side device, and a repeated description thereof will be omitted here.

Figure 11A:
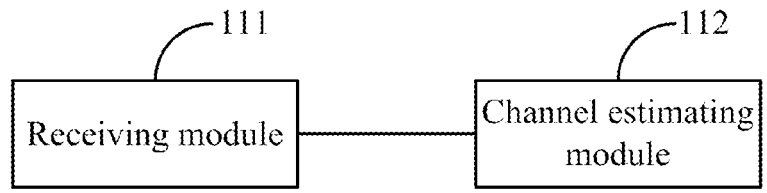
FIG. 11A illustrates a schematic functionally structural diagram of a network-side device for receiving a reference signal according to an embodiment of the disclosure.

Referring to FIG. 11, a network-side device for receiving a reference signal according to an embodiment of the disclosure includes:

A receiving module 111 is configured to receive reference signals, configured on pilot ports, transmitted from the network side, where the pilot ports include at least one row of horizontal pilot ports and one column of vertical pilot ports, and the reference signals configured on the horizontal pilot ports are horizontal reference signals, whereas the reference signals configured on the vertical pilot ports are vertical reference signals; and A channel estimating module 112 is configured to estimate channel information of the horizontal pilot ports and the vertical pilot ports respectively from the horizontal reference signals and the vertical reference signals.

Preferably the receiving module 111 is further configured:

To receive configuration information of the horizontal reference signals and the vertical reference signals transmitted from the network side, where the configuration information includes sub-frame configurations of the horizontal reference signals and the vertical reference signals, and configurations of the horizontal pilot ports and the vertical pilot ports.

Figure 11B:
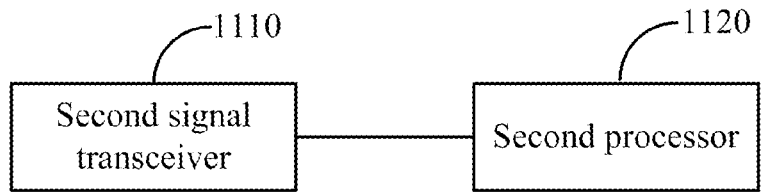
FIG. 11B illustrates a schematic physically structural diagram of a network-side device for receiving a reference signal according to an embodiment of the disclosure.

Particularly in hardware, the receiving module 111 can be a signal transceiver including transmit and receive antennas, etc., and the channel estimating module 112 can be a processor, and at this time, as illustrated in FIG. 11B, a network-side device for receiving a reference signal according to an embodiment of the disclosure includes:

A second signal transceiver 1110 is configured to receive reference signals, configured on pilot ports, transmitted from the network side, where the pilot ports include at least one row of horizontal pilot ports and one column of vertical pilot ports, and the reference signals configured on the horizontal pilot ports are horizontal reference signals, whereas the reference signals configured on the vertical pilot ports are vertical reference signals; and A second processor 1120 is configured to estimate channel information of the horizontal pilot ports and the vertical pilot ports respectively from the horizontal reference signals and the vertical reference signals.

Preferably the second signal transceiver 1110 is further configured:

To receive configuration information of the horizontal reference signals and the vertical reference signals transmitted from the network side, where the configuration information includes sub-frame configurations of the horizontal reference signals and the vertical reference signals, and configurations of the horizontal pilot ports and the vertical pilot ports.

Where the network-side device according to the embodiment of the disclosure can be an evolved Node B, a low-power transmitting node, etc., and the receiver can be a UE, a relay node, etc.

Based upon the same inventive idea, an embodiment of the disclosure further provides a system for transmitting a reference signal, and since the system addresses the problem under a similar principle to the method for transmitting a reference signal and the method for receiving a reference signal above, reference can be made to the implementations of the method above for an implementation of the system, and a repeated description thereof will be omitted here.

Figure 12:
FIG. 12 illustrates a schematic structural diagram of a system for transmitting a reference signal according to an embodiment of the disclosure.

Referring to FIG. 12, an embodiment of the disclosure provides a system for transmitting a reference signal, the system including:

A network side device 120 is configured to determine sub-frames for carrying reference signals, to determine pilot ports of the reference signals and to transmit the reference signals, configured on the pilot ports, in the determined sub-frames; and A receiver 130 is configured to receive the reference signals, configured on the pilot ports, transmitted from the network side device 120 and to estimate channel information of the horizontal pilot ports and the vertical pilot ports respectively from the horizontal reference signals and the vertical reference signals, Where all the pilot ports include at least one row of horizontal pilot ports and one column of vertical pilot ports, and the reference signals configured on the horizontal pilot ports are horizontal reference signals, whereas the reference signals configured on the vertical pilot ports are vertical reference signals.

Several particular examples will be listed below:

In a first example, horizontal reference signals and vertical reference signals are configured in different sub-frames, and both the horizontal reference signals and the vertical reference signals are configured periodically the same as CSI-RS reference signals (that is, they are configured by configuration information of CSI-RS's defined in the 3GPP standard, e.g., transmission periodicities, sub-frame offset and other configuration information), and the horizontal reference signals and the vertical reference signals can be mapped onto the same or different frequency resources; and if the horizontal reference signals and the vertical reference signals are configured with the same transmission periodicity P and different sub-frame offsets $\Delta_H$ (the sub-frame offset of the horizontal reference signals) and $\Delta_V$ (the sub-frame offset of the vertical reference signals), Then a horizontal reference signal is configured in the $(n+\Delta_H)$-th sub-frame, a vertical reference signal is configured in the $(n+\Delta_V)$-th sub-frame, a horizontal reference signal is configured in the $(n+P+\Delta_H)$-th sub-frame, a vertical reference signal is configured in the $(n+P+\Delta_V)$-th sub-frame, and so on, where n represents a positive integer; and Horizontal pilot ports can be determined by constant antenna virtualization weights, or any row in the array of antennas can be selected as horizontal pilot ports; and alike vertical pilot ports can be determined by constant antenna virtualization weights, or any column in the array of antennas can be selected as vertical pilot ports.

The network side notifies a receiver of configuration information of the horizontal reference signals and the vertical reference signals, and the configuration information includes information about resource configurations and sub-frame configurations of the horizontal reference signals and the vertical reference signals and can further include indication information to indicate configuration information for the horizontal reference signals and configuration information for the vertical reference signals.

In a second example, horizontal reference signals and vertical reference signals are configured periodically the same as CSI-RS reference signals, and the horizontal reference signals and the vertical reference signals are configured with the same or different frequency resources; and if the horizontal reference signals and the vertical reference signals are configured with different transmission periodicities and the same sub-frame offset, that is, the horizontal reference signals are transmitted at the periodicity $P_H$, and the vertical reference signals are transmitted at the periodicity $P_V$, and their sub-frame offset is $\Delta$, where $P_V=K*P_H$, and K represents a positive integer, Then a horizontal reference signal is configured in the (n+$\Delta$)-th sub-frame, a horizontal reference signal is configured in the (n+$P_H$+$\Delta$)-th sub-frame, . . . , both a horizontal reference signal and a vertical reference signal are configured in the (n+K*$P_H$+$\Delta$)-th sub-frame, and so on; and Horizontal pilot ports can be determined by constant antenna virtualization weights, or any row in the array of antennas can be selected as horizontal pilot ports; and alike vertical pilot ports can be determined by constant antenna virtualization weights, or any column in the array of antennas can be selected as vertical pilot ports.

The network side notifies a receiver of configuration information of the horizontal reference signals and the vertical reference signals, and the configuration information includes information about resource configurations and sub-frame configurations of the horizontal reference signals and the vertical reference signals and can further include indication information to indicate configuration information for the horizontal reference signals and configuration information for the vertical reference signals.

In a third example, horizontal reference signals and vertical reference signals are configured in different sub-frames, and both the horizontal reference signals and the vertical reference signals are configured periodically the same as CSI-RS reference signals, and the horizontal reference signals and the vertical reference signals are configured with the same or different frequency resources; and if the horizontal reference signals and the vertical reference signals are configured with different transmission periodicities and different sub-frame offsets, that is, the horizontal reference signals are transmitted at the periodicity $P_H$, and the vertical reference signals are transmitted at the periodicity $P_V$, and the sub-frame offset of the horizontal reference signals is $\Delta_H$, and the sub-frame offset of the vertical reference signals is $\Delta_V$, where $P_V=K*P_H$, and K represents a positive integer, Then a horizontal reference signal is configured in the (n+$\Delta_H$)-th sub-frame, a horizontal reference signal is configured in the (n+$P_H$+$\Delta_H$)-th sub-frame, . . . , a horizontal reference signal is configured in the (n+K*$P_H$+$\Delta_H$)-th sub-frame, a vertical reference signal is configured in the (n+K*$P_H$+$\Delta_V$)-th sub-frame, and so on, where n represents a positive integer; and Horizontal pilot ports can be determined by constant antenna virtualization weights, or any row in the array of antennas can be selected as horizontal pilot ports; and alike vertical pilot ports can be determined by constant antenna virtualization weights, or any column in the array of antennas can be selected as vertical pilot ports.

The network side notifies a receiver of configuration information of the horizontal reference signals and the vertical reference signals, and the configuration information includes information about resource configurations and sub-frame configurations of the horizontal reference signals and the vertical reference signals and can further include indication information to indicate configuration information for the horizontal reference signals and configuration information for the vertical reference signals.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the network-side device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for transmitting a reference signal, wherein the method comprises:
   determining, by the network side, sub-frames for carrying reference signals;

determining, by the network side, pilot ports of the reference signals; and transmitting, by the network side, the reference signals, configured on the pilot ports, in the determined sub-frames, wherein all the determined pilot ports comprise at least one row of horizontal pilot ports and one column of vertical pilot ports, and the reference signals configured on the horizontal pilot ports are horizontal reference signals, whereas the reference signals configured on the vertical pilot ports are vertical reference signals;

wherein the horizontal reference signals and the vertical reference signals are Channel State Information-Reference Signals, CSI-RS's, defined in the 3GPP standard;

wherein if the sub-frames carrying the horizontal reference signals and the sub-frames carrying the vertical reference signals are the same sub-frames, determining, by the network side, the pilot ports of the reference signals comprises:

configuring, by the network side, all of antenna ports in an array of antenna ports as pilot ports and determining each row of pilot ports as a row of horizontal pilot ports and each column of pilot ports as a column of vertical pilot ports, wherein the array of antenna ports is an array in which antenna ports supported by a cell are arranged, and a row in the array of antenna ports represents a horizontal direction and comprises M antenna ports, a column therein represents a vertical direction and comprises N antenna ports, and both M and N represent positive integers no less than 1; or virtualizing, by the network side, antennas according to the array of antenna ports into a row of pilot ports and a column of pilot ports for which reference signals need to be configured and determining the row of pilot ports as horizontal pilot ports and the column of pilot ports as vertical pilot ports, wherein the number of the row of pilot ports is M, and the number of the column of pilot ports is N;

wherein determining, by the network side, each row of pilot ports as a row of horizontal pilot ports and each column of pilot ports as a row of vertical pilot ports further comprises:

if M*N is no larger than the largest number of ports configurable for CSI-RS's, then determining, by the network side, the same CSI-RS configuration defined in the 3GPP standard as configurations of the reference signal of each horizontal pilot port and the reference signal of each vertical pilot port, wherein the CSI-RS configuration comprises a periodicity at which, an offset of a sub-frame in which, and time and frequency locations at which a CSI-RS is transmitted; or the network side allocates port numbers 15 to (15+M−1) for each row of pilot ports so that the port numbers of each row of horizontal pilot ports are 15 to (15+M−1), and all the port numbers of the j-th column of vertical pilot ports are (15+j−1), wherein j represents an integer and the value of j ranges from 1 to M; and the network side allocates port numbers 15 to (15+N−1) for each column of pilot ports so that the port numbers of each column of vertical pilot ports are 15 to (15+N−1), all the port numbers of the i-th row of horizontal pilot ports are (15+i−1), wherein i represents an integer and the value of i ranges from 1 to N;

wherein virtualizing, by the network side, the antennas comprises:

virtualizing, by the network side, the antennas by constant antenna virtualization weights into a row of pilot ports and a column of pilot ports for which reference signals need to be configured; and configuring, by the network side, a row of pilot ports as a result of virtualizing the antennas as horizontal pilot ports and a column of pilot ports as the result of virtualizing the antennas as vertical pilot ports further comprises:

if M+N is no larger than the largest number of ports configurable for CSI-RS's, then determining, by the network side, the same CSI-RS configuration defined in the 3GPP standard as configurations of the reference signal of each horizontal pilot port and the reference signal of each vertical pilot port.

2. The method of claim 1, in a case that if M*N is no larger than the largest number of ports configurable for CSI-RS's, then determining, by the network side, the same CSI-RS configuration defined in the 3GPP standard as configurations of the reference signal of each horizontal pilot port and the reference signal of each vertical pilot port, the network side allocates port numbers 15 to (15+M*N−1) for the pilot ports, wherein the port numbers of the i-th row of horizontal pilot ports are 15+(i−1)*M to 15+i*M−1 respectively, and accordingly the port numbers of each column of vertical pilot ports are determined from each row of horizontal pilot ports, wherein i represents an integer and the value of i ranges from 1 to N; or the port numbers of the j-th column of vertical pilot ports are 15+(j−1)*N to 15+j*N−1 respectively, and accordingly the port numbers of each row of horizontal pilot ports are determined from each column of vertical pilot ports, wherein j represents an integer and the value of i ranges from 1 to N.

3. The method of claim 1, in a case that if M+N is no larger than the largest number of ports configurable for CSI-RS's, then determining, by the network side, the same CSI-RS configuration defined in the 3GPP standard as configurations of the reference signal of each horizontal pilot port and the reference signal of each vertical pilot port, wherein the network side allocates port numbers 15 to (15+M*N−1) for the pilot ports.

4. The method of claim 1, wherein configuring, by the network side, a row of pilot ports as a result of virtualizing the antennas as horizontal pilot ports and a column of pilot ports as the result of virtualizing the antennas as vertical pilot ports further comprises:

determining, by the network side, different CSI-RS configurations defined in the 3GPP standard respectively as configurations of the reference signals of the horizontal pilot ports and the reference signals of the vertical pilot ports.

5. The method of claim 1, wherein if the sub-frames carrying the horizontal reference signals and the sub-frames carrying the vertical reference signals are different sub-frames, then determining, by the network side, the pilot ports for which the reference signals are configured comprises:

virtualizing, by the network side, antennas from an array of antenna ports into a row of pilot ports and a column of pilot ports for which reference signals need to be configured and determining the row of pilot ports as horizontal pilot ports and the column of pilot ports as vertical pilot ports, wherein the number of the row of pilot ports is M, and the number of the column of pilot ports is N, and both M and N represent positive integers no less than 1;

wherein virtualizing, by the network side, the antennas comprises:
selecting and configuring, by the network side, some row and some column from the array of antenna ports as pilot ports; or
virtualizing, by the network side, the antennas by constant antenna virtualization weights into a row of pilot ports and a column of pilot ports for which reference signals need to be configured;
wherein transmitting, by the network side, the reference signals, configured on the pilot ports, in the determined sub-frames comprises:
transmitting, by the network side, the reference signals, configured on the horizontal pilot ports, in the sub-frames carrying the horizontal reference signals in each preset periodicity at which the horizontal reference signals are transmitted; and/or
transmitting, by the network side, the reference signals, configured on the vertical pilot ports, in the sub-frames carrying the vertical reference signals in each preset periodicity at which the vertical reference signals are transmitted;
wherein a periodicity at which the vertical reference signals are transmitted is the same as a periodicity at which the horizontal reference signals are transmitted; or
the periodicity at which the vertical reference signals are transmitted is J times the periodicity at which the horizontal reference signals are transmitted, wherein J represents an integer no less than 1; or
the periodicity at which the horizontal reference signals are transmitted is K times the periodicity at which the vertical reference signals are transmitted, wherein K represents an integer no less than 1;
wherein determining, by the network side, the horizontal pilot ports and the vertical pilot ports comprises:
selecting and configuring, by the network side, different rows from respective rows in an array of antenna ports as pilot ports in each periodicity at which the horizontal reference signals are transmitted; and
selecting and configuring different columns from respective columns in the array of antenna ports as pilot ports in each periodicity at which the vertical reference signals are transmitted.

6. The method of claim 4, wherein the network side allocates port numbers 15 to (15+M−1) for the horizontal pilot ports; and
the network side allocates port numbers 15 to (15+N−1) for the vertical pilot ports.

7. The method of claim 1, wherein the method further comprises:
transmitting, by the network side, configuration information of the horizontal reference signals and the vertical reference signals to a receiver, wherein the configuration information comprises sub-frame configurations of the horizontal reference signals and the vertical reference signals, and configurations of the horizontal pilot ports and the vertical pilot ports;
wherein the configuration information further comprises indication information to indicate configuration information for the horizontal reference signals and configuration information for the vertical reference signals among the configuration information;
wherein the network side transmits the configuration information of the horizontal reference signals and the vertical reference signals to the receiver in higher-layer signaling or physical layer control signaling.

8. A method for receiving a reference signal, wherein the method comprises:
receiving, by a receiver, reference signals, configured on pilot ports, transmitted from the network side, wherein all the pilot ports comprise at least one row of horizontal pilot ports and one column of vertical pilot ports, and the reference signals configured on the horizontal pilot ports are horizontal reference signals, the reference signals configured on the vertical pilot ports are vertical reference signals; and
estimating, by the receiver, channel information of the horizontal pilot ports and the vertical pilot ports respectively from the horizontal reference signals and the vertical reference signals;
wherein before the receiver receives the reference signals configured on the pilot ports, the method further comprises:
receiving, by the receiver, configuration information of the horizontal reference signals and the vertical reference signals transmitted from the network side, wherein the configuration information comprises sub-frame configurations of the horizontal reference signals and the vertical reference signals, and configurations of the horizontal pilot ports and the vertical pilot ports;
wherein the horizontal reference signals and the vertical reference signals are Channel State Information-Reference Signals, CSI-RS's, defined in the 3GPP standard;
wherein if the sub-frames carrying the horizontal reference signals and the sub-frames carrying the vertical reference signals are the same sub-frames, the pilot ports of the reference signals are determined by the network side as follows:
the network side configures all of antenna ports in an array of antenna ports as pilot ports and determines each row of pilot ports as a row of horizontal pilot ports and each column of pilot ports as a column of vertical pilot ports, wherein the array of antenna ports is an array in which antenna ports supported by a cell are arranged, and a row in the array of antenna ports represents a horizontal direction and comprises M antenna ports, a column therein represents a vertical direction and comprises N antenna ports, and both M and N represent positive integers no less than 1; or
the network side virtualizes antennas according to the array of antenna ports into a row of pilot ports and a column of pilot ports for which reference signals need to be configured and determining the row of pilot ports as horizontal pilot ports and the column of pilot ports as vertical pilot ports, wherein the number of the row of pilot ports is M, and the number of the column of pilot ports is N;
wherein the network side determining each row of pilot ports as a row of horizontal pilot ports and each column of pilot ports as a row of vertical pilot ports further comprises:
if M*N is no larger than the largest number of ports configurable for CSI-RS's, then the network side determining the same CSI-RS configuration defined in the 3GPP standard as configurations of the reference signal of each horizontal pilot port and the reference signal of each vertical pilot port, wherein the CSI-RS configuration comprises a periodicity at which, an offset of a sub-frame in which, and time and frequency locations at which a CSI-RS is transmitted; or
the network side allocates port numbers 15 to (15+M−1) for each row of pilot ports so that the port numbers of each row of horizontal pilot ports are 15 to (15+M−1), and all the port numbers of the j-th column of vertical pilot ports are (15+j−1), wherein j represents an integer and the value of j ranges from 1 to M; and the network side allocates port numbers 15 to (15+N−1) for each column of pilot ports so that the port numbers of each column of vertical pilot ports are 15 to (15+N−1), all the port numbers of the i-th row of horizontal pilot ports are (15+i−1), wherein i represents an integer and the value of i ranges from 1 to N;

wherein the network side virtualizing the antennas comprises:

the network side virtualizing the antennas by constant antenna virtualization weights into a row of pilot ports and a column of pilot ports for which reference signals need to be configured; and the network side configuring a row of pilot ports as a result of virtualizing the antennas as horizontal pilot ports and a column of pilot ports as the result of virtualizing the antennas as vertical pilot ports further comprises:

if M+N is no larger than the largest number of ports configurable for CSI-RS's, then the network side determining the same CSI-RS configuration defined in the 3GPP standard as configurations of the reference signal of each horizontal pilot port and the reference signal of each vertical pilot port.

9. A network-side device for transmitting a reference signal, wherein the network-side device comprises:

one or more processors; and a memory, wherein:

the memory is configured to store one or more computer readable program codes, and the one or more processors are configured to execute the one or more computer readable program codes to perform operations of:

determining sub-frames for carrying reference signals;

determining pilot ports of the reference signals; and transmitting the reference signals, configured on the pilot ports, in the determined sub-frames, wherein all the determined pilot ports comprise at least one row of horizontal pilot ports and one column of vertical pilot ports, and the reference signals configured on the horizontal pilot ports are horizontal reference signals, the reference signals configured on the vertical pilot ports are vertical reference signals;

wherein the horizontal reference signals and the vertical reference signals are Channel State Information-Reference Signals, CSI-RS's, defined in the 3GPP standard;

wherein if the sub-frames carrying the horizontal reference signals and the sub-frames carrying the vertical reference signals are the same sub-frames, determining, by the network side, the pilot ports of the reference signals comprises:

configuring, by the network side, all of antenna ports in an array of antenna ports as pilot ports and determining each row of pilot ports as a row of horizontal pilot ports and each column of pilot ports as a column of vertical pilot ports, wherein the array of antenna ports is an array in which antenna ports supported by a cell are arranged, and a row in the array of antenna ports represents a horizontal direction and comprises M antenna ports, a column therein represents a vertical direction and comprises N antenna ports, and both M and N represent positive integers no less than 1; or virtualizing, by the network side, antennas according to the array of antenna ports into a row of pilot ports and a column of pilot ports for which reference signals need to be configured and determining the row of pilot ports as horizontal pilot ports and the column of pilot ports as vertical pilot ports, wherein the number of the row of pilot ports is M, and the number of the column of pilot ports is N;

wherein determining, by the network side, each row of pilot ports as a row of horizontal pilot ports and each column of pilot ports as a row of vertical pilot ports further comprises:

if M*N is no larger than the largest number of ports configurable for CSI-RS's, then determining, by the network side, the same CSI-RS configuration defined in the 3GPP standard as configurations of the reference signal of each horizontal pilot port and the reference signal of each vertical pilot port, wherein the CSI-RS configuration comprises a periodicity at which, an offset of a sub-frame in which, and time and frequency locations at which a CSI-RS is transmitted; or the network side allocates port numbers 15 to (15+M−1) for each row of pilot ports so that the port numbers of each row of horizontal pilot ports are 15 to (15+M−1), and all the port numbers of the j-th column of vertical pilot ports are (15+j−1), wherein j represents an integer and the value of j ranges from 1 to M; and the network side allocates port numbers 15 to (15+N−1) for each column of pilot ports so that the port numbers of each column of vertical pilot ports are 15 to (15+N−1), all the port numbers of the i-th row of horizontal pilot ports are (15+i−1), wherein i represents an integer and the value of i ranges from 1 to N;

wherein virtualizing, by the network side, the antennas comprises:

virtualizing, by the network side, the antennas by constant antenna virtualization weights into a row of pilot ports and a column of pilot ports for which reference signals need to be configured; and configuring, by the network side, a row of pilot ports as a result of virtualizing the antennas as horizontal pilot ports and a column of pilot ports as the result of virtualizing the antennas as vertical pilot ports further comprises:

if M+N is no larger than the largest number of ports configurable for CSI-RS's, then determining, by the network side, the same CSI-RS configuration defined in the 3GPP standard as configurations of the reference signal of each horizontal pilot port and the reference signal of each vertical pilot port.

10. The network-side device of claim 9, wherein if the sub-frames carrying the horizontal reference signals and the sub-frames carrying the vertical reference signals are different sub-frames, then determining, by the network side, the pilot ports for which the reference signals are configured comprises:

virtualizing, by the network side, antennas from an array of antenna ports into a row of pilot ports and a column of pilot ports for which reference signals need to be configured and determining the row of pilot ports as horizontal pilot ports and the column of pilot ports as vertical pilot ports, wherein the number of the row of pilot ports is M, and the number of the column of pilot ports is N, and both M and N represent positive integers no less than 1;

wherein virtualizing, by the network side, the antennas comprises:

selecting and configuring, by the network side, some row and some column from the array of antenna ports as pilot ports; or virtualizing, by the network side, the antennas by constant antenna virtualization weights into a row of pilot ports and a column of pilot ports for which reference signals need to be configured;

wherein transmitting, by the network side, the reference signals, configured on the pilot ports, in the determined sub-frames comprises:

transmitting, by the network side, the reference signals, configured on the horizontal pilot ports, in the sub-frames carrying the horizontal reference signals in each preset periodicity at which the horizontal reference signals are transmitted; and/or transmitting, by the network side, the reference signals, configured on the vertical pilot ports, in the sub-frames carrying the vertical reference signals in each preset periodicity at which the vertical reference signals are transmitted;

wherein a periodicity at which the vertical reference signals are transmitted is the same as a periodicity at which the horizontal reference signals are transmitted; or the periodicity at which the vertical reference signals are transmitted is J times the periodicity at which the horizontal reference signals are transmitted, wherein J represents an integer no less than 1; or the periodicity at which the horizontal reference signals are transmitted is K times the periodicity at which the vertical reference signals are transmitted, wherein K represents an integer no less than 1;

wherein determining, by the network side, the horizontal pilot ports and the vertical pilot ports comprises:

selecting and configuring, by the network side, different rows from respective rows in an array of antenna ports as pilot ports in each periodicity at which the horizontal reference signals are transmitted; and selecting and configuring different columns from respective columns in the array of antenna ports as pilot ports in each periodicity at which the vertical reference signals are transmitted.

11. The network-side device of claim 9, wherein the one or more processors are configured to execute the one or more computer readable program codes to further perform operations of transmitting configuration information of the horizontal reference signals and the vertical reference signals to a receiver, wherein the configuration information comprises sub-frame configurations of the horizontal reference signals and the vertical reference signals, and configurations of the horizontal pilot ports and the vertical pilot ports.

* * * * *